April 14, 1925.  1,533,506
W. A. MANN
BOW ATTACHMENT FOR SPECTACLES
Filed March 12, 1923
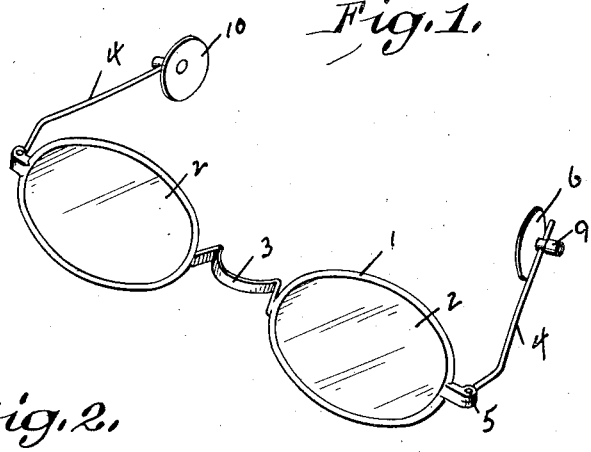
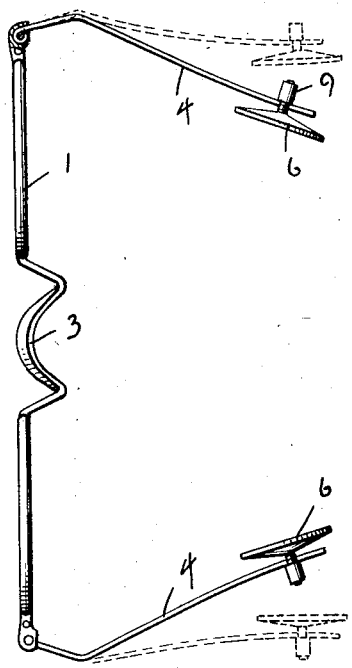
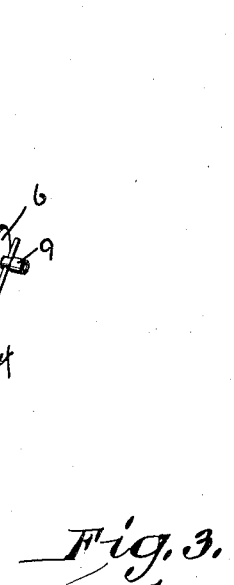
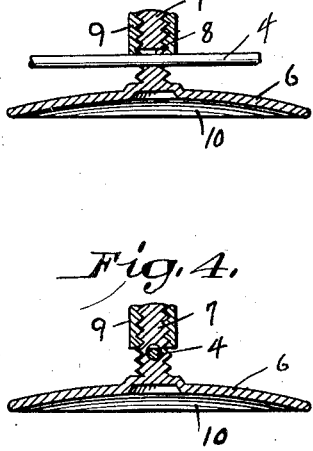
William A Mann, Inventor
By
Attorney Patented Apr. 14, 1925.

1,533,506

UNITED STATES PATENT OFFICE.

WILLIAM A. MANN, OF KANKAKEE, ILLINOIS.

BOW ATTACHMENT FOR SPECTACLES.

Application filed March 12, 1923. Serial No. 624,549.

*To all whom it may concern:*

Be it known that I, WILLIAM A. MANN, a citizen of the United States, residing at Kankakee, in the county of Kankakee and State of Illinois, have invented certain new and useful Improvements in a Bow Attachment for Spectacles, of which the following is a specification.

This invention relates to improvements in spectacles and has for its prime object to provide means for securely retaining the spectacles in an operative position without the necessity of having the bows of the glasses engage the ears of the user in any way.

A further object of my invention is to provide a sliding attachment for the bows of a pair of spectacles which can be adjusted in any position on the bows for engaging the temples of the wearer, thus firmly supporting the glasses in an operative position.

A still further object of my invention is to provide an attachment for spectacles of the above indicated character, which is so constructed that when placed on the bows of a pair of spectacles and applied to the temples or sides of the head of the wearer, the attachment will provide a suction or vacuum, thus reducing to a minimum the danger of the spectacles falling from the nose of the wearer.

A further object of my invention is to provide an attachment of the above indicated character, which is simple in construction, durable, efficient for the purpose intended, and one that can be manufactured and sold in connection with spectacles already on the market at a relatively low cost.

These and like objects of the invention will be better understood as the description follows and as is specifically pointed out in the appended claims.

Referring to the accompanying drawing which forms a part of this specification and which clearly illustrates the construction and operation of my improved bow attachment, Figure 1 is a perspective view of a pair of spectacles showing my attachment applied thereto.

Figure 2 is a top plan view of same, showing in dotted lines the position the bows and attachment would assume when being applied to the head of the user.

Figure 3 is an enlarged vertical view of same through the attachment showing the means of securing same on the bow, and Figure 4 is a similar view taken from the opposite side of same.

Referring to the drawing in detail, like characters will be used to designate like parts in the different views.

In the drawing, the numeral 1 indicates the frame of a pair of spectacles, which comprises lenses 2 and a nose piece 3. Bows 4 are hingedly connected to the frame as at 5. In the usual construction of the bows, they are usually made of such lengths as to extend to the back of the ears and then downwardly, thus providing means for preventing the glasses from falling from the nose of the wearer. The most objectionable feature found in this method of constructing bows is that same not only proves annoying to the wearer of the glasses, but the bows have a tendency to rub behind the ears which creates a very painful knot and sometimes terminates into a cancer. My improved bow attachment has been constructed to eliminate this annoyance and danger, by providing the bows which are of such length as not to reach as far as the ears, with a convexo-concave member as indicated by the numeral 6. The outer side of each of the members 6 is provided with an exterior screw threaded shank 7 having an aperture 8 extending therethrough. A screw threaded cap 9 is adapted to be screwed on the end of the shank 7 until same engages the bow 4, thus firmly locking the attachment at any desired position on the bow. The concave face 10 of each of the members 6 creates a suction when brought into engagement with the temples or sides of the head of the user, thus reducing to a minimum the possibility of the glasses being dislodged from their position on the nose of the wearer.

While I have shown and described the preferred form of my invention, I realize that various minor changes may be resorted to, without departing from the spirit and scope of the invention as claimed, and therefore, I do not wish to limit myself to the exact details of construction, nor to the combination and arrangement of parts.

What I claim as new and desire to secure by Letters Patent is:

1. In an attachment for spectacles of the above-described character, a convexo-concave member slidably supported on the bows of the spectacles, a screw threaded shank formed centrally of each of said convexo-concave members, means mounted on said screw threaded shank for holding said convexo-concave members in any adjusted position, and means for creating a suction between the concave face of each of the said convexo-concave members for supporting the glasses in position.

2. In an attachment for spectacles, convexo-concave members slidably supported on the bows of the spectacles, a screw threaded shank formed centrally of each of the said convexo-concave members and having a transverse opening therethrough to receive the bows, and a screw threaded cap adapted to thread on the shank and engage the bows to lock the convexo-concave members in adjusted position.

In testimony whereof, I have affixed my signature in the presence of two witnesses:

WILLIAM A. MANN.

Witnesses:
  A. S. MANN,
  CHAS. O. NUCE.